United States Patent
Elmasry et al.

(10) Patent No.: US 11,304,078 B2
(45) Date of Patent: Apr. 12, 2022

(54) SYSTEM AND METHOD FOR GENERATING CONTROL AND NON-PAYLOAD COMMUNICATION (CNPC) CONGESTION METRICS AT A GROUND CONTROL STATION

(71) Applicant: Rockwell Collins, Inc., Cedar Rapids, IA (US)

(72) Inventors: George F. Elmasry, San Marcos, CA (US); Boe A. Svatek, Cedar Rapids, IA (US); George Tyler Barney, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/024,266

(22) Filed: Sep. 17, 2020

(65) Prior Publication Data
US 2022/0086668 A1    Mar. 17, 2022

Related U.S. Application Data

(63) Continuation-in-part of application No. 17/018,019, filed on Sep. 11, 2020.

(51) Int. Cl.
*H04W 24/08* (2009.01)
*H04B 7/185* (2006.01)
*H04W 72/04* (2009.01)

(52) U.S. Cl.
CPC ........ *H04W 24/08* (2013.01); *H04B 7/18506* (2013.01); *H04W 72/0446* (2013.01); *H04W 72/0453* (2013.01); *H04W 72/0486* (2013.01)

(58) Field of Classification Search
CPC ......... H04W 24/08; H04W 72/0446–72/0486; H04B 7/18506
See application file for complete search history.

(56) References Cited

U.S. PATENT DOCUMENTS

| | | | | |
|---|---|---|---|---|
| 5,123,112 A | * | 6/1992 | Choate | H04B 7/185 370/329 |
| 5,212,804 A | * | 5/1993 | Choate | H04B 7/185 455/431 |

(Continued)

FOREIGN PATENT DOCUMENTS

| | | |
|---|---|---|
| CN | 103209037 B | 4/2015 |
| CN | 109889288 A | 6/2019 |

(Continued)

OTHER PUBLICATIONS https://newjerseywireless.org/feed-rss/ericsson-calls-out-dynamic-spectrum-sharing-as-key-to-nationwide-5g-coverage/, "Ericsson calls out dynamic spectrum sharing as key to nationwide 5G coverage", Ericsson, First Printed Aug. 5, 2020, 5 pages.

(Continued)

*Primary Examiner* — Gennadiy Tsvey
(74) *Attorney, Agent, or Firm* — Suiter Swantz pc llo

(57) ABSTRACT

A fusion engine configured for execution on a ground radio station (GRS) for an unmanned aircraft system (UAS) operating environment is disclosed. In embodiments, the fusion engine tracks the wait times of UAS required to share a C2 channel while waiting for a full C2 link with the GRS, as well as the dynamic availability of C2 channels for full or shared C2 links over time. Based on the collected wait times and availability variables, the fusion engine generates congestion metrics relevant to the capacity of the GRS, e.g., its available spectrum resources, to effectively provide C2 services to every UAS operating within its coverage area. Congestion metrics include expected wait times on a shared C2 link for a UAS in service (e.g., waiting for a full C2 link) and/or the expected number of C2 channels available at the GRS at a given time.

15 Claims, 7 Drawing Sheets

(56) References Cited

U.S. PATENT DOCUMENTS

| | | | |
|---|---|---|---|
| 7,979,200 B2 * | 7/2011 | Bay | G08G 5/0013 |
| | | | 701/120 |
| 8,451,751 B2 | 5/2013 | Challapali et al. | |
| 8,494,546 B2 | 7/2013 | Hu | |
| 8,654,771 B1 | 2/2014 | Singh et al. | |
| 8,976,762 B2 | 3/2015 | Vlantis et al. | |
| 9,237,043 B1 | 1/2016 | Beals et al. | |
| 9,326,291 B2 | 4/2016 | Luo et al. | |
| 9,648,589 B2 | 5/2017 | Weaver et al. | |
| 9,872,182 B2 | 1/2018 | Smith et al. | |
| 9,986,440 B2 | 5/2018 | Guvenc | |
| 10,264,463 B2 | 4/2019 | McHenry et al. | |
| 10,477,549 B2 | 11/2019 | Watts | |
| 10,645,627 B2 | 5/2020 | Abdul et al. | |
| 2012/0120892 A1 | 5/2012 | Freda et al. | |
| 2012/0134328 A1 | 5/2012 | Gauvreau et al. | |
| 2017/0055179 A1 | 2/2017 | Radunovic et al. | |
| 2017/0215178 A1 * | 7/2017 | Kim | H04W 72/048 |
| 2017/0215220 A1 * | 7/2017 | Kim | H04W 76/11 |
| 2017/0325221 A1 * | 11/2017 | Jalali | H04W 36/0085 |
| 2018/0160433 A1 * | 6/2018 | Kim | H04B 7/18504 |
| 2019/0054937 A1 | 2/2019 | Graetz et al. | |
| 2019/0230671 A1 * | 7/2019 | Kim | H04W 74/00 |
| 2020/0120458 A1 * | 4/2020 | Aldana | H04W 72/048 |
| 2020/0187013 A1 | 6/2020 | Mody et al. | |
| 2020/0245167 A1 | 7/2020 | Kleinbeck et al. | |

FOREIGN PATENT DOCUMENTS

| | | |
|---|---|---|
| CN | 110392350 A | 10/2019 |
| CN | 110602758 A | 12/2019 |
| EP | 2837223 A4 | 1/2016 |
| GB | 2461724 B | 2/2011 |
| KR | 1020150095008 A | 8/2015 |
| KR | 1020170105559 A | 9/2017 |
| KR | 101836480 B1 | 3/2018 |
| KR | 101949709 B1 | 2/2019 |

OTHER PUBLICATIONS

Lin, Y. et al., "Dynamic Spectrum Interaction of UAV Flight Formation Communication with Priority: A Deep Reinforcement Learning Approach," in IEEE Transactions on Cognitive Communications and Networking, doi: 10.1109/TCCN.2020.2973376, Downloaded Feb. 14, 2020, 12 pages.

U.S. Appl. No. 17/018,019, filed Sep. 11, 2020, entitled System and Method for Adaptiveextension of Command and Control (C2) Backhaul Network Forunmanned Aircraft Systems (UAS).

U.S. Appl. No. 17/024,279, filed Sep. 17, 2020, entitled System and Method for Same-Channel Out-Of-Band Spectrum Sensing for Command and Control (C2) Communications To Unmanned Aircraft Systems (UAS).

U.S. Appl. No. 17/024,309, filed Sep. 17, 2020, entitled System and Method for Spectrum Situational Awareness Via Server-Based Fusion in a Command and Control (C2) Link System for Unmanned Aircraft Systems (UAS).

* cited by examiner

SYSTEM AND METHOD FOR GENERATING CONTROL AND NON-PAYLOAD COMMUNICATION (CNPC) CONGESTION METRICS AT A GROUND CONTROL STATION

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Patent Application entitled SYSTEM AND METHOD FOR ADAPTIVE EXTENSION OF COMMAND AND CONTROL (C2) BACKHAUL NETWORK FOR UNMANNED AIRCRAFT SYSTEMS (UAS), having application Ser. No. 17/018,019, filed Sep. 11, 2020;

Concurrently filed U.S. Patent Application entitled SYSTEM AND METHOD FOR SAME-CHANNEL OUT-OF-BAND SPECTRUM SENSING FOR COMMAND AND CONTROL (C2) COMMUNICATIONS TO UNMANNED AIRCRAFT SYSTEMS (UAS), and application Ser. No. 17/024,279;

Concurrently filed U.S. Patent Application entitled SYSTEM AND METHOD FOR SPECTRUM SITUATIONAL AWARENESS VIA SERVER-BASED FUSION IN A COMMAND AND CONTROL (C2) LINK SYSTEM FOR UNMANNED AIRCRAFT SYSTEMS (UAS), and application Ser. No. 17/024,309.

Said U.S. patent application Ser. Nos. 17/018,019; 17/024,279; and 17/024,309 are herein incorporated by reference in their entirety.

BACKGROUND

Ground radio stations (GRS) can be configured to manage and monitor unmanned aircraft systems (UAS). For example, a GRS can establish command and control (C2) links to one or more UAS whose flight plans provide for operations within the transmission range of the GRS. However, each GRS has a finite amount of transmission resources, in particular a limited portion of the radio frequency (RF) spectrum allocated for C2 link management. As UAS traffic density increases, a given GRS may not be able to effectively manage every UAS in its operating area at all times. The GRS may not have sufficient advance information to anticipate traffic patterns, and hardware-based upgrades to the GRS can be cumbersome and expensive yet provide only a temporary solution.

SUMMARY

A ground radio station (GRS) for a command and control (C2) link system is disclosed. In embodiments, the GRS includes a communications interface comprising antenna elements and transceivers. The GRS includes a traffic manager for establishing and maintaining, in conjunction with the communications interface C2 links to air radio stations (ARS) aboard unmanned aircraft systems (UAS) operating within the coverage area and/or transmission range of the GRS. When the number n of UAS in service to the GRS meets or exceeds the total number N of C2 channels allocated to the GRS, the traffic manager establishes contingency C2 links whereby two or more UAS share (e.g., via time slotting/slicing) a single C2 channel. The GRS includes a fusion engine for tracking the wait time of each UAS waiting on a contingency C2 link (e.g., sharing a C2 channel) until a full C2 link on an unshared C2 channel is available. The fusion engine also generates dynamic variables S by tracking the number n of UAS in service over time. The fusion engine generates normalized congestion metrics specific to the GRS by fusing the collected wait times and the dynamic variables.

In some embodiments, the congestion metrics include time metrics, e.g., an expected wait time for a UAS intending to establish a C2 link to the GRS.

In some embodiments, the time metrics include time submetrics, e.g., a standard deviation of the expected wait time and a maximum wait time.

In some embodiments, the congestion metrics include channel availability metrics, e.g., an expected number of available C2 channels.

In some embodiments, the channel availability metrics include channel availability submetrics, e.g., a standard deviation of the expected number of available C2 channels and an expected idle time, e.g., the duration or likelihood the GRS has no UAS in service and this all C2 channels are available.

In some embodiments, the congestion metrics identify and track the duration of various GRS operating states, e.g., a nominal state of the GRS, wherein the dynamic distribution S of UAS in service is less than the number N of available C2 channels; an off-nominal or saturated state where S greater than or equal to N but still less than W, or the maximum number of UAS servable by the GRS via full and contingency C2 links; and a critical or danger state wherein S is greater than or equal to W, e.g., the GRS has no spectrum resources available for either full or contingency C2 links.

In some embodiments, the fusion engine collects the wait times of UAS waiting for a contingency C2 link, e.g., to a critical-state GRS.

In some embodiments, the fusion engine directs the GRS to signal one or more UAS in service to request the UAS transfer its C2 link to a different GRS to free up spectrum resources.

In some embodiments, the fusion engine forwards the congestion metrics and submetrics to a centralized spectrum arbitrator.

A method for generating command and control (C2) congestion metrics at a ground radio station (GRS) of a C2 link system is also disclosed. In embodiments, the method includes establishing, via the GRS, C2 links to unmanned aircraft systems (UAS) within the coverage area or transmission range of the GRS, each C2 link on a C2 channel allocated to the GRS. The method includes, when the number n of UAS in service to the GRS meets or exceeds the number of N C2 channels allocated to the GRS, establishing contingency C2 links to two or more UAS on a shared C2 channel. The method includes collecting, via a fusion engine of the GRS, wait times for each UAS waiting on a contingency C2 link (e.g., on a shared C2 channel) for a standard C2 link on an unshared C2 channel. The method includes generating, via the fusion engine, dynamic variables S tracking the number n of UAS in service to the GRS over time. The method includes generating congestion metrics for the GRS by fusing the wait times and dynamic variables.

In some embodiments, the method includes generating time metrics, e.g., an expected wait time, and/or time submetrics, e.g., a standard deviation of the expected wait time and a maximum wait time.

In some embodiments, the method includes generating C2 channel availability metrics, e.g., an expected number of available C2 channels, and/or C2 channel availability submetrics, e.g., a standard deviation of the expected number of available C2 channels and an expected idle time.

In some embodiments, the method includes identifying one or more GRS operating states, e.g., a nominal state of the GRS, wherein S<N; an off-nominal/saturated state of the GRS, wherein S≥N and S<W, and W is an integer corresponding to the maximum number of UAS concurrently servable by the GRS via the at least one set of contingency C2 links; and a critical/danger state of the GRS, wherein S≥W.

In some embodiments, the method includes signaling one or more UAS in service based on the congestion metrics, e.g., to request the UAS transfer its C2 link to another UAS to free up spectrum resources.

In some embodiments, the method includes transmitting the congestion metrics to a centralized spectrum arbitrator.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
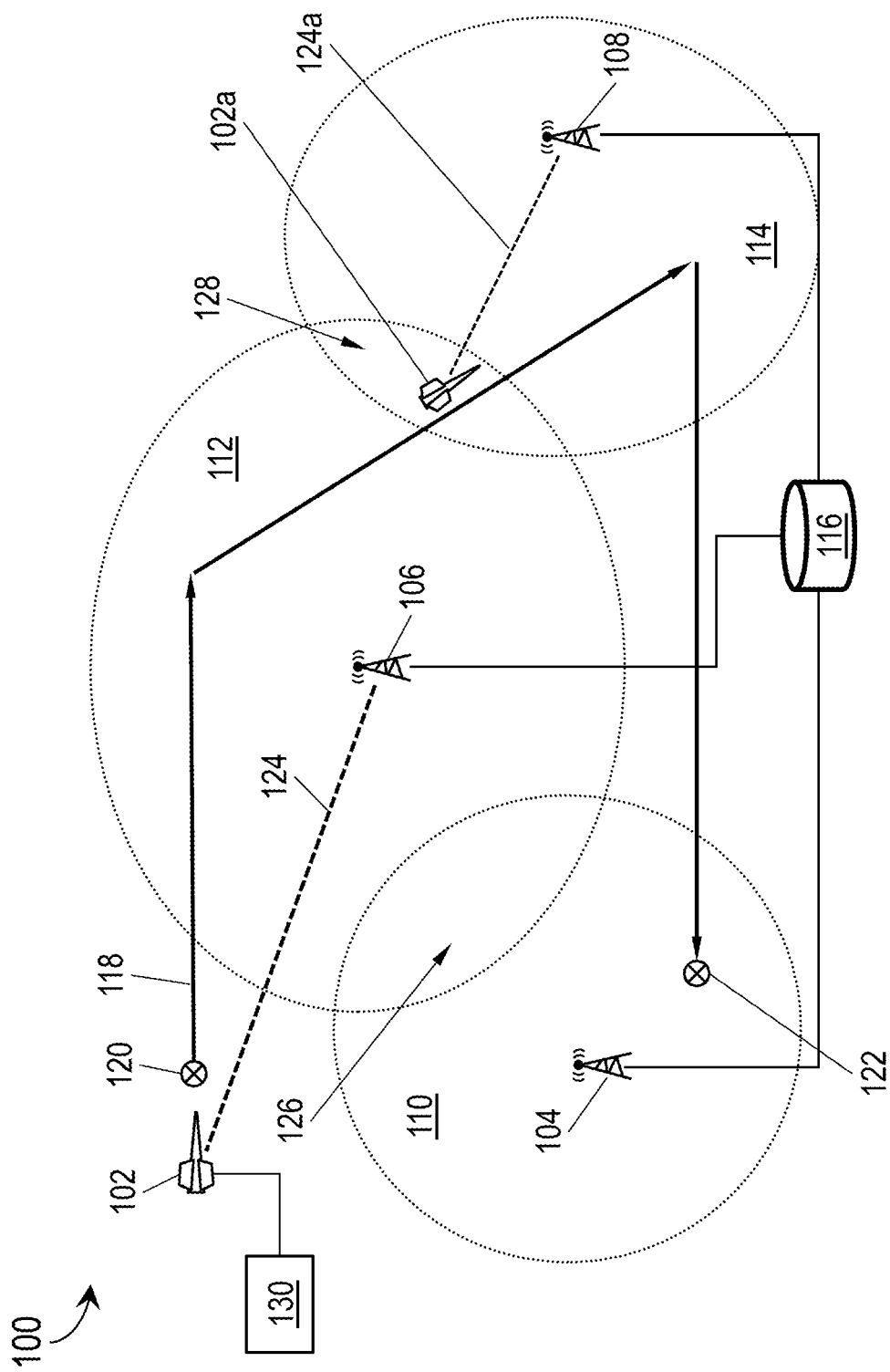
FIG. 1 is a diagrammatic illustration of an unmanned aircraft system (UAS) operating environment according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a software-based fusion engine to ground radio stations (GRS) managing and monitoring the command and control (C2) operations of unmanned aircraft systems (UAS), e.g., via control and non-payload communications (CNPC) waveforms. The fusion engine continually tracks critical data points related to C2 traffic management and the capacity of each GRS (e.g., in a network of GRS) to effectively serve its constituent UAS. By fusing the collected data points, the fusion engine can determine if its GRS is oversubscribed or undersubscribed—i.e., if the GRS has fewer or greater radio frequency (RF) spectrum resources than it actually needs. Further, central control facilities managing the CNPC network of GRS can control and allocate spectrum access on a dynamic and proactive basis. Corner cases can be effectively addressed to optimize the capacity of each individual GRS and the network as a whole, while individual UAS operators can use congestion metrics to more effectively plan flight paths and flight times to optimize network capacity. Normalized and unified congestion metrics and submetrics can accurately represent spectrum congestion and usage across multiple GRS across the C2 link system regardless of the individual hardware/software components or allocated spectrum resources of any individual GRS.

FIG. 1—Operating Environment

Referring to FIG. 1, an operating environment 100 (e.g., C2 link system) for unmanned aircraft systems (UAS) 102 is disclosed. The operating environment 100 may include ground radio stations 104, 106, and 108 (GRS), respectively serving coverage areas 110, 112, and 114, and centralized spectrum arbitrator 116.

In embodiments, the operating environment 100 may comprise a collection of interconnected coverage areas 110, 112, 114 within which the UAS 102 may operate. For example, the UAS 102 may file a flight plan providing for operations along a flight path 118 between an origin point 120 and a destination 122. The flight path 118 may direct the UAS 102 along, or proximate to, a predetermined route through the coverage area 112, into the coverage area 114, and finally into the coverage area 110 within which the destination 122 may be located.

In embodiments, while operating in the coverage area 112, the GRS 106 serving that coverage area may establish and maintain a command and control (C2) link 124 to the UAS 102 as well as any other UAS operating within the coverage area 112 or otherwise in service to the GRS 106 (e.g., UAS within transmission range of the GRS). For example, the coverage areas 110, 112, 114 may be defined by a geographical area within a predetermined transmission range of their corresponding GRS 104, 106, 108. The bounds of a coverage area may include a predetermined altitude or a temporal boundary. For example, the operating environment 100 may include peripheral areas 126, 128 within the transmission range of more than one GRS or coverage area (e.g., the peripheral area 126 within the range of GRS 104, 106/coverage areas 110, 112 and the peripheral area 128 within the range of GRS 106, 108/coverage areas 112, 114); accordingly, the peripheral area 126 may be served by the GRS 104 at some predetermined times and by the GRS 106 during other predetermined times.

In embodiments, the GRS 106 may use the C2 link 124 to transmit operating commands to, and receive diagnostic information from, the UAS 102. For example, the GRS 106 may use the C2 link 124 to monitor the progress of the UAS 102 along its flight path 118 via the C2 link 124, issuing commands to guide the UAS away from areas where communications may be less reliable or where atmospheric or other conditions may impede the mission of the UAS. When the flight path 118 of the UAS 102 passes out of the coverage area 112 into the coverage area 114 (e.g., when the UAS (102a) is within the peripheral area 128), the UAS may be "handed off" from the GRS 106, establishing a new C2 link (124a) to the GRS 108 (e.g., when the C2 signal transmitted by the GRS 108 is sufficiently strong for C2 operations, or stronger than the signal transmitted by the GRS 106) while terminating the C2 link 124 to the GRS 106, seamlessly continuing operations within the coverage area 114.

In embodiments, each GRS 104, 106, 108 may have a finite amount of spectrum resources for the maintenance of C2 links 124 to each UAS 102 operating within its coverage area 112, 114, 116. For example, the centralized spectrum arbitrator 116 (e.g., central server) may manage and allocating spectrum resources to each individual GRS 104, 106, 108 and throughout the operating environment 100.

In embodiments, the UAS 102 may be autonomous or semi-autonomous, e.g., controlled in full or in part by a remote operator 130. For example, the remote operator 130 may issue C2 commands via the GRS 106, or may serve as a backup controller if one or more autonomous systems fail aboard the UAS 102 or must be overwritten. Similarly, the centralized spectrum arbitrator 116 may in turn serve as a backup operator of the UAS 102 (e.g., via C2 commands over the C2 link 124 issued by a human in the loop (HITL)) should the remote operator 130 become incapacitated.

Figure 2A:
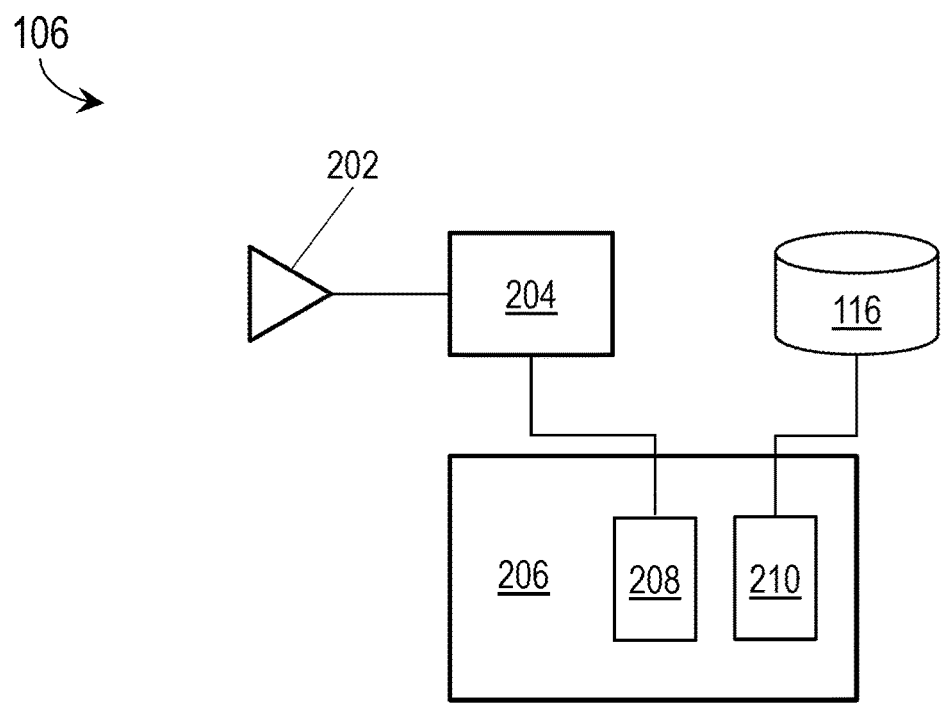
FIG. 2A is a block diagram of a ground radio station (GRS) of the UAS operating environment of FIG. 1.

FIG. 2A—GRS and Fusion Engine

Referring now to FIG. 2A, the GRS 106 is disclosed. The GRS 104, 108 of FIG. 1 may be implemented and may function similarly to the GRS 106.

In embodiments, referring in particular to FIG. 2A, the GRS 106 may include a communications interface, e.g., directional, omnidirectional, and/or sectoral antenna elements 202 and one or more transceivers 204, for managing communications with the UAS (102, FIG. 1) operating within its coverage area (112, FIG. 1) or, e.g., within its transmission range. For example, the transceivers 204 may be in communication with, or may be incorporated into, control processors 206 (e.g., the GRS 106 may be a partially or fully software-defined radio (SDR) system). The GRS 106 may establish C2 links (124, FIG. 1) and communicate with its constituent UAS 102 via control and non-payload communication (CNPC) waveforms.

In embodiments, the GRS 106 may include a traffic manager 208 and fusion engine 210. For example, the traffic manager 208 and fusion engine 210 may be implemented as software-based modules configured for execution on the control processors 206 of the GRS 106. The traffic manager 208 may be responsible for establishing, maintaining, and/or terminating C2 links 124 with each UAS 102 in service to the GRS 106 (e.g., within the coverage area 112 or within transmission range of the GRS).

The fusion engine 210 may continually capture data points relevant to each constituent UAS 102 served by the GRS 106, fusing the data points to generate congestion metrics and forwarding the congestion metrics to the centralized spectrum arbitrator 116. The centralized spectrum arbitrator 116 may analyze congestion metrics from the GRS 106 and other GRS (104, 108) operating within the operating environment 100 in order to anticipate likely congestion issues before they happen and proactively implement dynamic spectrum access across the network of GRS. For example, the centralized spectrum arbitrator 116 may redistribute spectrum resources such that high-demand GRS are allocated adequate spectrum resources and low-demand GRS are not allocated more spectrum resources than they actually need.

Figure 2B:
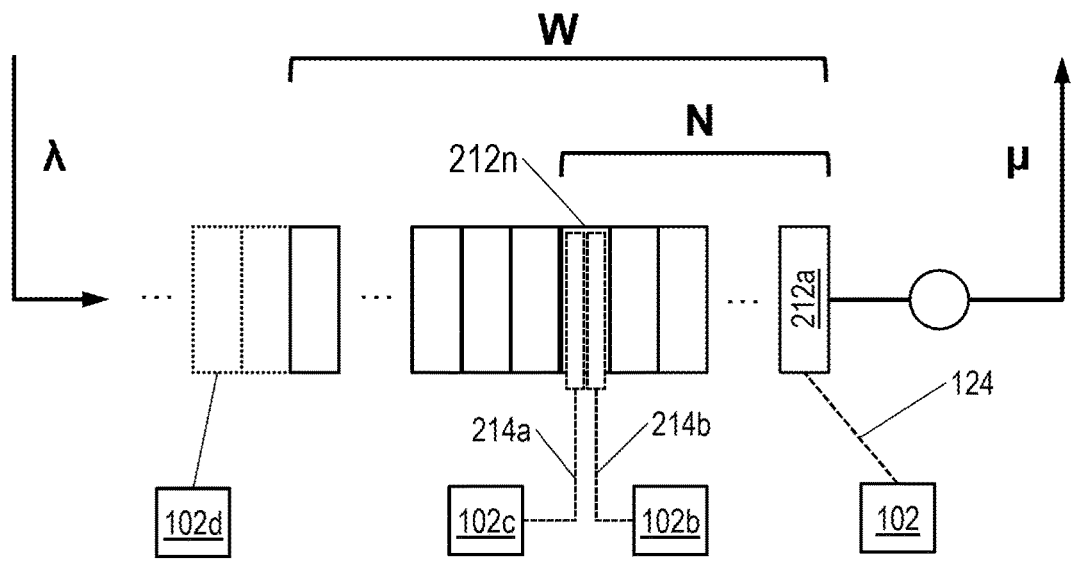
FIG. 2B is a diagrammatic illustration of command and control (C2) traffic management of the GRS of FIG. 2A.

FIG. 2b—Spectrum Management

Referring also to FIG. 2B, the GRS 106 may be allocated a finite amount of spectrum resources (e.g., by the centralized spectrum arbitrator 116). For example, the GRS 106 may be allocated an integer number N of C2 channels 212a, . . . 212n (e.g., equivalent segments in an allocated CNPC frequency band) and may therefore be configured to simultaneously serve N UAS (102, FIG. 1; e.g., maintain a full C2 link (124, FIG. 1) with N UAS, via the traffic manager 208) at any given time.

In embodiments, the GRS 106 may actually serve (e.g., maintain C2 links 124 with) an integer number n of different UAS 102 operating within its coverage area (112, FIG. 1) at any given time. For example, while N may remain consistent (e.g., between network restructurings or reallocations of spectrum resources throughout the operating environment (100, FIG. 1)), n will vary over time according to traffic patterns and/or flight plans (e.g., throughout the day or even within an hour or two). The relationship between n and N, and the dynamic variable S, representing the probability distribution of n over time, may be crucial to understanding whether the GRS 106 is oversubscribed or undersubscribed.

In embodiments, the relationship between the GRS 106 and its constituent UAS 102 may be modelled as a queue by which the changing relationship between n and N, the dynamic variable S, and their effect on the GRS 106 may be monitored. For example, the GRS 106 may be associated with an arrival rate $\lambda$, or the rate at which new UAS 102 enter the coverage area 112 of the GRS 106 and must switch over to the GRS, e.g., establish a C2 link 124 to the GRS. Similarly, the GRS 106 may be associated with a service rate $\mu$, or the rate at which UAS 102 currently linked/in service to the GRS 106 enter a new coverage area or transmission range, and thus switch over to a new GRS, terminating the C2 link 124 to the GRS 106. It follows broadly, with respect to the ratio $\lambda{:}\mu$ between the arrival rate $\lambda$ and the service rate $\mu$, that a higher ratio $\lambda{:}\mu$ may be conducive to bottlenecking or oversubscription, and a lower ratio $\lambda{:}\mu$ may be conducive to undersubscription.

In embodiments, the GRS 106 may be associated with a nominal (e.g., non-critical) state corresponding to S<N, e.g., when the probability distribution S of the number n of UAS 102 currently served by the GRS 106 is less than the number N of C2 channels 212*a-n* allocated to the GRS, or the maximum number N of UAS the GRS can simultaneously serve while maintaining the nominal state. When in the nominal state, any new UAS 102 entering the coverage area 112 of the GRS 106 may establish a C2 link 124 to the GRS on an otherwise unoccupied/unused C2 channel 212*a-n*.

In embodiments, increasing C2 traffic may cause the GRS 106 to transition from the nominal state to an off-nominal (e.g., saturated) state corresponding to N≤S<W, where W is the maximum integer number of UAS 102 supportable by the GRS 106 in the off-nominal state. For example, a benefit of the CNPC waveform is that it allows C2 channels 212*a-n* to be split such that the GRS 106 can establish C2 contingency links 214*a-b* to two different UAS 102*b-c* on a single C2 channel 212*a*. A contingency link 214*a-b* may require alterations to the CNPC frame scheduling structure and may require the two UAS 102*b-c* to share the C2 channel 212*a* in interleaving time periods, providing each UAS 102*b-c* with half the communication time the UAS would otherwise have via a standard C2 link 124. Contingency links 214*a-b* may be intended as a solely temporary measure, until another UAS 102 served by the GRS 106 switches over to a different GRS and S≤N, restoring the nominal state and allowing each UAS 102*b-c* to establish a standard/full C2 link 124 on a distinct C2 channel 212*a-n*. If, for example, the GRS 106 is required to share many C2 channels 212*a-n*, this may indicate oversubscription of the GRS (e.g., the GRS may have insufficient spectrum resources to handle its contingent of UAS traffic at one or more times). Similarly, if one or more C2 channels 212*a-n* remain shared for long periods of time before another C2 channel is released, this may also indicate oversubscription. In embodiments, W may be equal to 2N, e.g., assuming each C2 channel 212*a-n* is capable of being shared by two contingency links 214*a-b*. However, in the event some C2 channels 212*a-n* are not shareable, W may be less than 2N; similarly, in the event some C2 channels are shareable by more than two UAS 102, 102*b-c*, W may be more than 2N.

In embodiments, the GRS 106 may further be associated with a critical or danger state, whereby S>W. For example, n and S may include not only the UAS 102, 102*b-c* currently served by the GRS 106 (e.g., via standard C2 links 124 and/or contingency C2 links 214*a-b*) but other UAS 102*d* entering the coverage area 112 of the GRS 106 that must establish a C2 link to the GRS 106. If, for example, every C2 channel 212*a-n* is committed to a C2 link 124 or a pair of contingency C2 links 214*a-b*, there may be no spectrum resources available to the UAS 102*d*. Accordingly, the UAS 102*d* may have to wait until a C2 channel 212*a-n* is available, but the resulting loss of C2 signaling for the UAS 102*d* is an unacceptable state and may create a threat level. While a very brief waiting period may not be inherently dangerous, the longer the UAS 102*d* waits for an open channel, the higher the probability of lost connectivity.

Accordingly, the fusion engine 210 may enable dynamic spectrum access across the operating environment 100, such that the GRS 106, and every other GRS within the operating environment, rarely enters the critical state (or, e.g., is rarely expected to be based on its anticipated UAS traffic). Similarly, even the off-nominal state described above, where every UAS 102*b-c* can communicate with the GRS 106 but some must do so via degraded contingency links 214*a-b* (which may not provide full C2 services and may further degrade), should be avoided or reduced to a low probability via proper deployment of the fusion engine 210.

In embodiments, the fusion engine 210 may track congestion at the GRS 106 by capturing one or more data points relevant to the capacity of the GRS to serve its constituent UAS 102, 102*b-c* over time, or at any given time (e.g., all UAS maintaining a C2 link 124 to the GRS, and/or any entering UAS 102*d* intending to establish a new C2 link 124 for operations within the coverage area 112 of the GRS). For example, the fusion engine 210 may track the wait time T of each UAS 102*b-c* waiting for a standard C2 link 124. For example, when the GRS 106 is in the off-nominal state, insufficient C2 channels 212*a-n* may be allocated to the GRS for every UAS 102*b-c* to establish a standard C2 link 124 on its own C2 channel. Accordingly, the one or more UAS 102*b-c* must wait on a C2 contingency link 214*a-b* before sufficient resources exist to establish standard C2 links 124 to both UAS. As both UAS 102*b-c* are waiting on a shared C2 channel 212*n*, the wait times of both UAS may be tracked independently (e.g., two wait times). Similarly, if the GRS 106 is in the critical state, the duration the entering UAS 102*d* must wait before establishing a link of any kind (e.g., either a standard C2 link 124 or a contingency link 214*a-b*) to the GRS 106 may also be tracked.

In embodiments, the fusion engine 210 may further track the exact number of C2 channels 212*a-n* shared at any given time (e.g., when the GRS 106 is either off-nominal or critical). Similarly, the fusion engine 210 may track S, or the number of UAS 102, 102*b-c* served by the GRS 106 at any given time. For example, from these two sets of data points may be derived the relationship between the number of shared C2 channels 212*a-n* and the number N of total C2 channels allocated to the GRS, as well as channel availability (e.g., E[(N-n)]) metrics and submetrics tracking relationship between the number n of UAS 102, 102*b-c* in service and the number N of total C2 channels (e.g., and therefore the number (N-n) of available C2 channels). In some embodiments, channel availability metrics and/or submetrics may track the number of C2 channels 212a-n shared by two or more UAS 102b-c, and the total duration that each C2 channel is shared.

In embodiments, the fusion engine 210 may periodically (e.g., hourly, daily, according to some other predetermined time interval) fuse collected wait times and dynamic variables into congestion metrics, forwarding the congestion metrics to the centralized spectrum arbitrator 116. For example, a first set of congestion metrics may include time metrics and submetrics based on collected wait times, which may include (but are not limited to, an expected wait time, or E[T]. For example, E[T] may be a statistical mean wait time of a UAS 102b waiting on a contingency C2 link 214a-b (e.g., and sharing a C2 channel 212n with another UAS 102c) until sufficient spectrum resources are available to establish a standard C2 link 124. Similarly, an expected wait time E[T'] may be a statistical mean wait time T' for an entering UAS 102d (e.g., when the GRS 106 is in the danger state) until either a contingency C2 link 214a-b or standard C2 link 124 is available.

In embodiments, congestion submetrics based on, or derived from, the expected wait time E[T] may include a standard deviation $\sigma_{E[T]}$ of E[T]; for example, a higher standard deviation $\sigma_{E[T]}$ may be associated with a higher degree of urgency. Similarly, congestion submetrics may include a maximum wait time $T_{max}$, e.g., the highest recorded wait time within a given timespan.

In embodiments, the fusion engine 210 may similarly generate E[(N-n)] metrics and submetrics related to the availability of C2 channels 212a-n over time, e.g., the relationship between the total number N of allocated C2 channels and the changing number of n UAS in service over time (and thus the number of unoccupied/unused C2 channels). For example, the channel availability metric E[(N-n)] may correspond to an expected number of C2 channels 212a-n available over time. In embodiments, channel availability submetrics may include (but are not limited to) a standard deviation of E[(N-n)] and a mean idle time corresponding to the duration that n=0, or when no UAS 102b-c are in service to the GRS 106.

Figure 3:
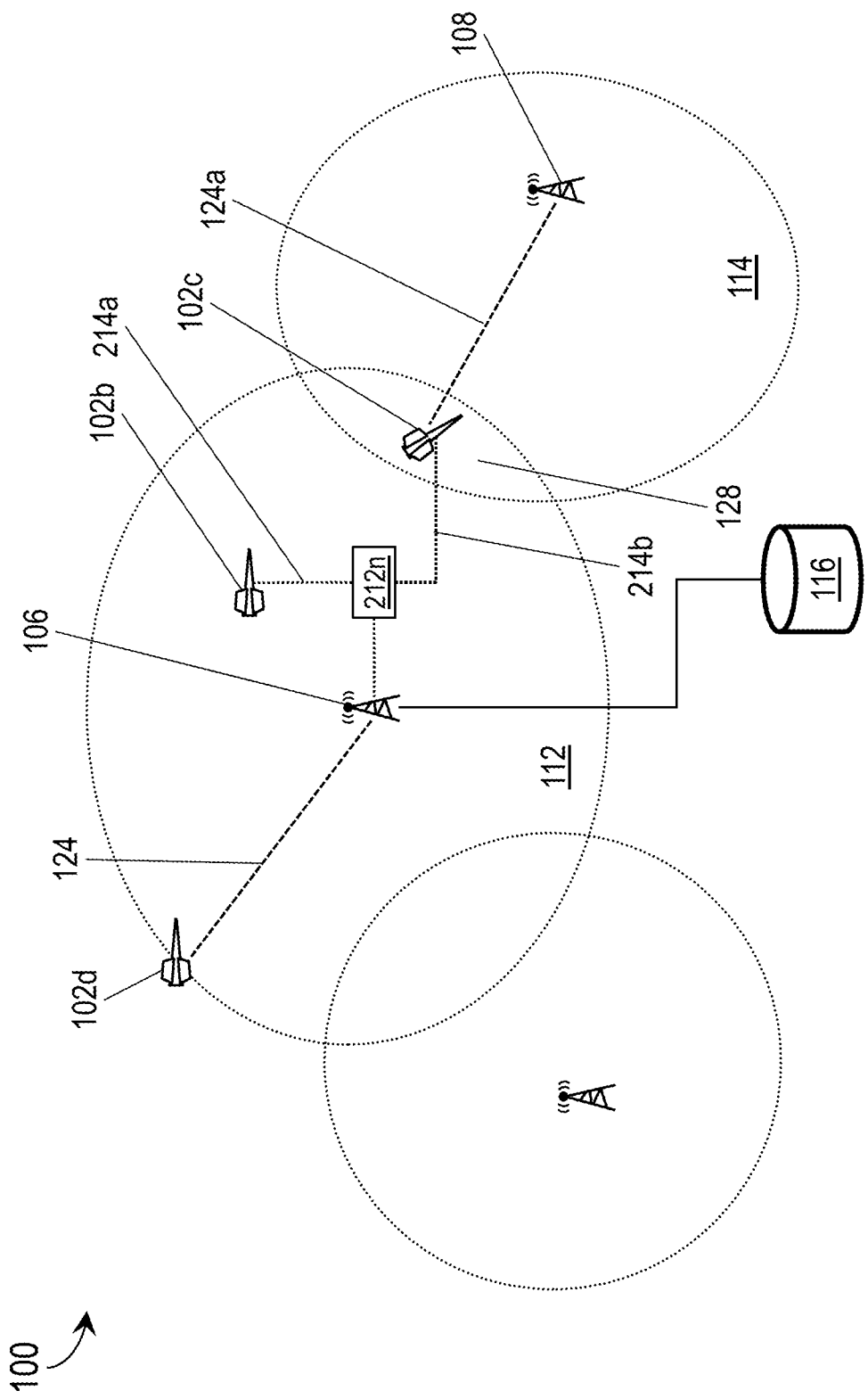
FIG. 3 is a diagrammatic illustration of operations of the UAS operating environment of FIG. 1.

FIG. 3—Applying Congestion Metrics

In embodiments, congestion metrics generated by the fusion engine 210 may provide the centralized spectrum arbitrator 116 with the ability to observe and anticipate hourly or daily traffic patterns for the GRS 106 (as well as every other GRS in the operating environment 100 reporting via a fusion engine 210).

Referring now to FIG. 3, the operating environment 100 is disclosed. In embodiments, the UAS 102d entering the coverage area 112 may need to establish a C2 link 124 to the GRS 106. However, the GRS 106 may be in an off-nominal or critical state such that sufficient spectrum resources may not immediately permit this. For example, the UAS 102b-c may share a C2 channel 212n via contingency C2 links 214a-b, e.g., for a duration exceeding a normal shared-channel wait time for the GRS 106 at that time of day. Further, the UAS 102c may be within the peripheral area 128 between the coverage areas 112, 114, and its entry into the coverage area 114 may be imminent.

In embodiments, the GRS 106 may signal the UAS 102c to determine if the UAS 102c is able to prematurely establish a C2 link (124a) to the GRS 108 serving the coverage area 114 and, if so, request the UAS execute the switchover (although, e.g., the UAS may not be required to execute the switchover unless mandated by the centralized spectrum arbitrator 116). If, for example, the UAS 102c can receive a sufficiently strong signal from the GRS 108, the UAS 102c may attempt to switch over to that GRS sooner than it ordinarily would (e.g., the UAS 102c may still be fully or partially within the coverage area 114). Should the UAS 102c successfully switch over to the GRS 108, the UAS may terminate its contingency C2 link 214b to the GRS 106, freeing up spectrum resources that may be used to establish either a standard C2 link 124 (or a contingency C2 link, if a standard C2 link is not yet possible) to the entering UAS 102d.

In some embodiments, use of the congestion metrics and/or submetrics may be affected by special circumstances and/or corner cases. For example, while increasing N (the number of C2 channels 212a-n allocated to the GRS 106) may be a standard response to congestion metrics indicating oversubscription of the GRS, if the GRS 106 is located at or serves an airport (e.g., an origin point (120, FIG. 1)), increasing N may result in bottlenecking at other GRS (108) within the operating environment 100. Instead, the centralized spectrum arbitrator 116 may space takeoffs from the airport proximate to the GRS 106 to regulate CNPC traffic flow into the operating environment 100, as wait time on the ground or runway is not critical.

In some embodiments, congestion metrics may indicate an oversubscribed, as well as an undersubscribed, GRS. In fairly redistributing spectrum resources where they are most needed, the central control facility may allocate spectrum resources away from undersubscribed GRS (e.g., where S consistently fails to approach N, or does not consistently remain above N) in order to allocate more spectrum resources to high-demand GRS where bottlenecking may occur due to a lack of available C2 channels 212a-n.

Figure 4:
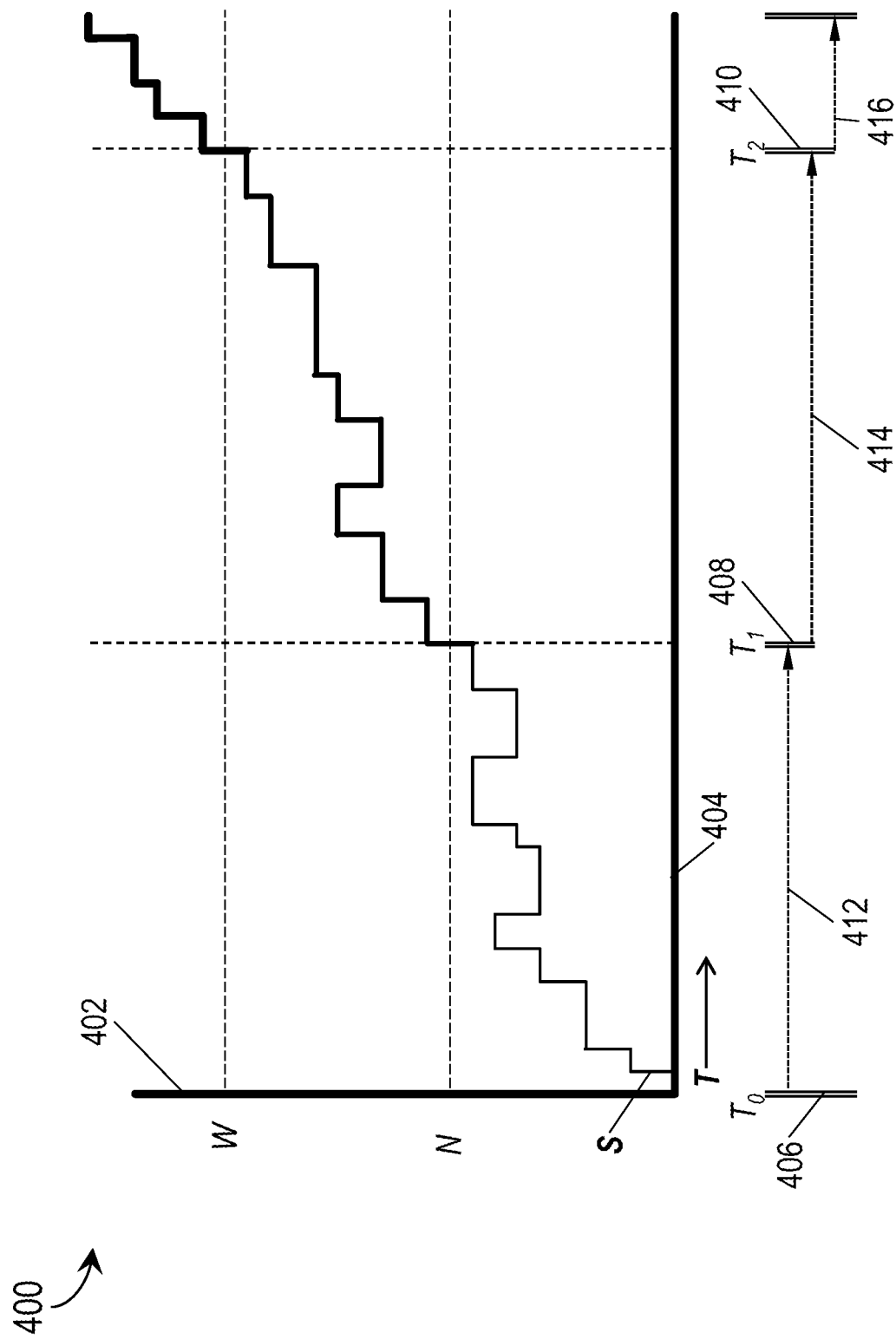
FIG. 4 is a graphic illustration of congestion metrics of the GRS of FIG. 2A.

FIG. 4—Grs Status Tracking

Referring to FIG. 4, the graph 400 is disclosed. The graph 400 may track S (y-axis 402), or the probability distribution of the number n of UAS (102, FIG. 1) simultaneously served by the GRS (106, FIG. 1) over time (x-axis 404).

In embodiments, the fusion engine (210, FIG. 2A) may track S over time (404) as UAS 102 enter and leave the coverage area (114, FIG. 1) served by the GRS 106, establishing and then terminating standard C2 links (124, FIG. 3) or contingency C2 links (212a-b, FIG. 3) as spectrum resources allow. For example, the graph 400 may correspond to a time window (e.g., an hour), beginning at an initial time $T_0$ (406), wherein UAS traffic handled by the GRS 106 increases on a roughly linear basis. At a time $T_1$ (408), the GRS 106 may enter the off-nominal state as S exceeds N and approaches W, and at a time $T_2$ (410) the GRS may enter the critical state as S exceeds W. Accordingly, the fusion engine 210 may track, over the total time represented by the graph 400, the time portions 412, 414, 416 during which the GRS 106 is respectively in the nominal state, the off-nominal state, and the critical state.

FIG. 5—F(S)

Figure 5:
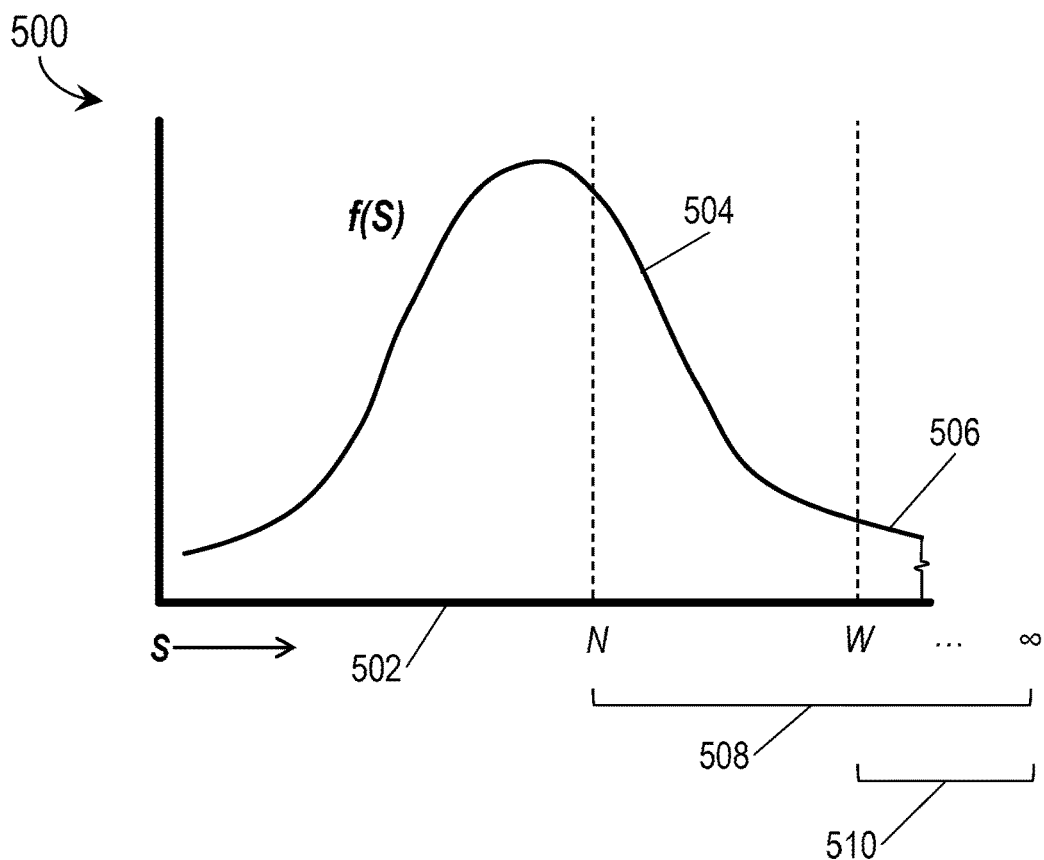
FIG. 5 is a graphic illustration of GRS usage metrics of the GRS of FIG. 2A.

Referring now to FIG. 5, the probability distribution function 500 (PDF) is disclosed. The PDF 500 may plot the likely saturation f(S) of the GRS (106, FIG. 1) over a predetermined time period, e.g., partially based on the graph 400 of the distribution S of UAS (102, FIG. 1) in service to the GRS over time. The PDF 500 may include x-axis 502 corresponding to S and PDF curve 504 corresponding to f(S).

In embodiments, the PDF curve 504 may represent an ideal, or at least an effective, deployment of the fusion engine (210, FIG. 2A) wherein S is most likely less than N and the likelihood of S exceeding W(506) is extremely low. For example, the law of large numbers suggests that the PDF curve 504 may present as a more or less normal bell curve PDF, where any deviations from a normal distribution S are still close approximations and the maximum n may serve as an outlier.

In embodiments, the centralized spectrum arbitrator (116, FIG. 1) may integrate the area under a portion of the PDF curve 504 based on a particular design threshold, e.g., the area 508 under the curve from N to infinity (e.g., the likelihood of S exceeding N) or the area 510 under the curve from W to infinity (e.g., the likelihood of S exceeding W). For example, large or increasing values may indicate an oversubscribed GRS 106 and very small values may indicate an undersubscribed GRS.

FIG. 6—F(T) AND F(T')

Figure 6:
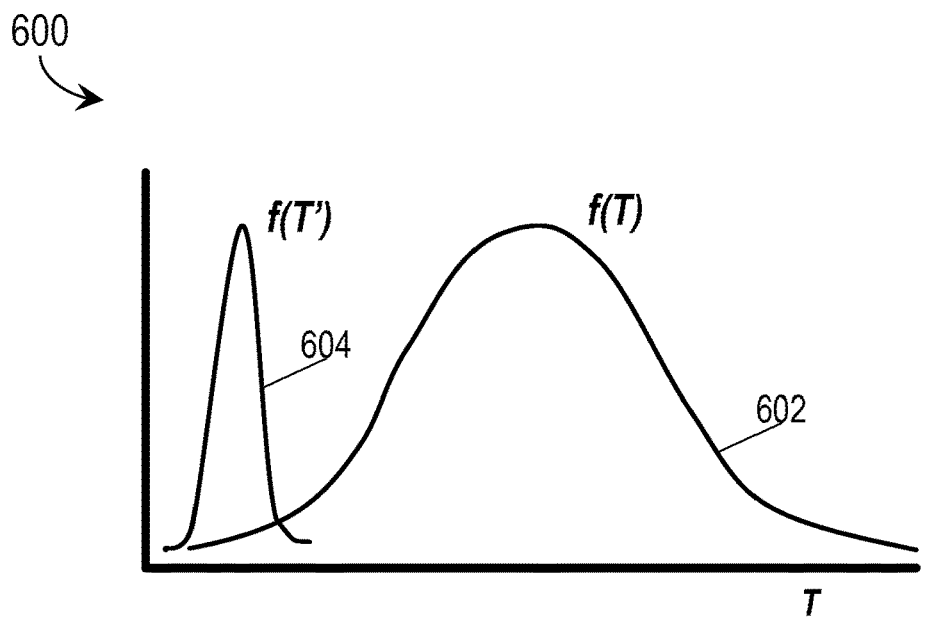
FIG. 6 is a graphic illustration of wait time metrics of the GRS of FIG. 2A.

Referring now to FIG. 6, the PDF 600 is shown. The PDF 600 may plot the distribution f(T) (602) of wait times T(e.g., the expected wait times E [T]) on contingency C2 links (214a-b, FIG. 2A)) as well as the distribution f(T) (604) of wait times T' (e.g., expected wait times E[T'] in the critical state when no spectrum resources are available to an entering UAS (102d, FIG. 2B).

In embodiments, as the wait time T' should be extremely short as noted above, the distribution f(T) (604) should be extremely narrow. It may further be noted that the distribution f(T') (602) of wait times T may be similar in shape to the PDF curve 504 (e.g., the distribution of f(S)). For example, the fusion engine 210 may normalize congestion metrics regardless of the number N of C2 channels 212a-n allocated to any particular GRS or the actual shape of the curve. The normalized PDF 600 may be adapted to other point-to-multipoint waveforms (e.g., other than CNPC) as a unified metric for assessing the distribution of spectrum resources throughout a network of GRS or other UAS control stations. Broadly speaking, the use of PDF 500, 600 to track the distribution of GRS saturation (e.g., f(S)) and/or wait times (e.g., f(T), f(T')) may provide for unified metrics and/or submetrics normalized for every GRS (FIG. 1: 104, 106, 108) throughout the operating environment (FIG. 1: 100) and untethered to, e.g., either the particular hardware or software components of any single GRS or the number N of C2 channels 212a-n allocated to any single GRS (which N may vary throughout the operating environment 100).

Figure 7A:
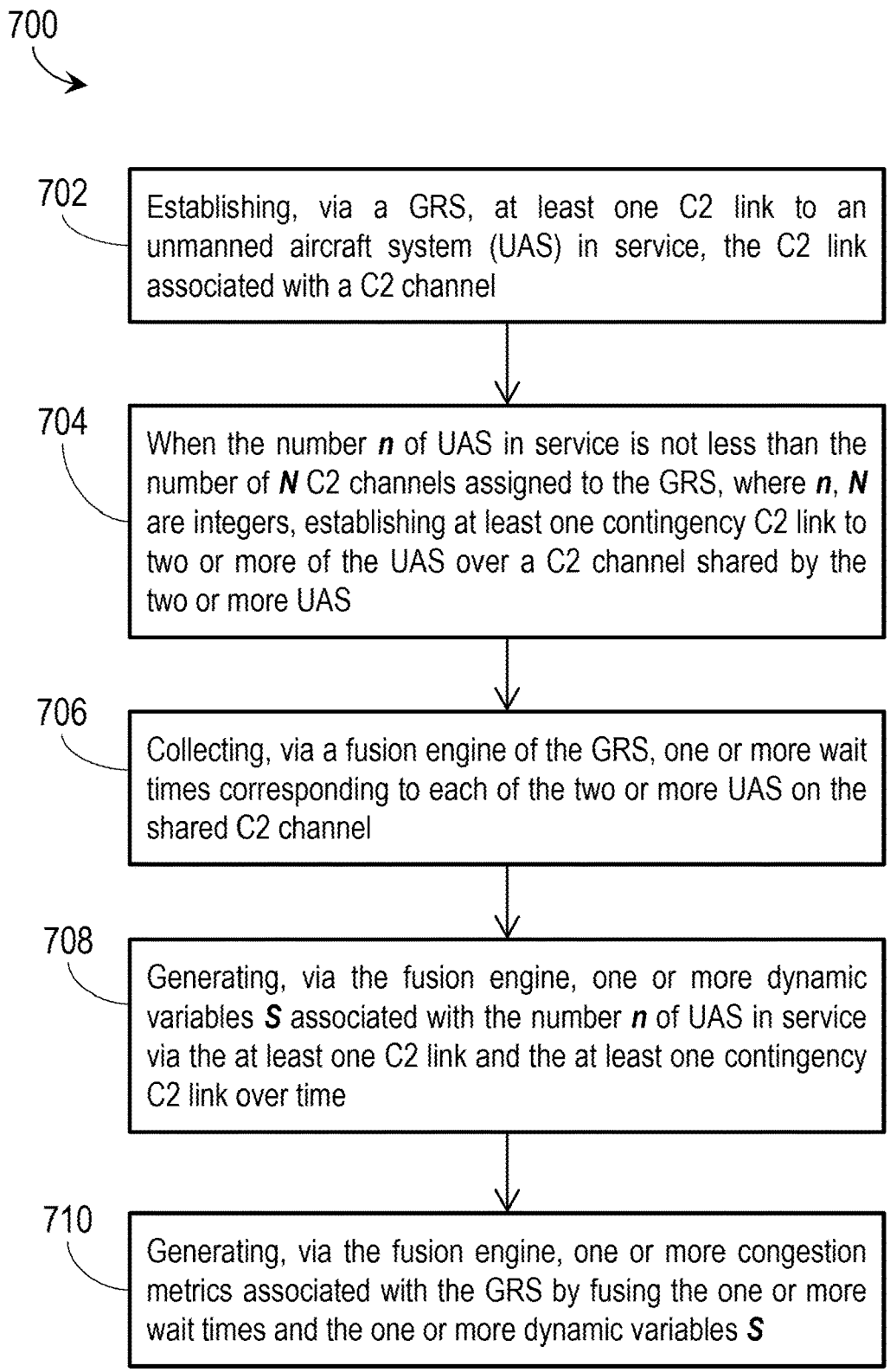
FIGS. 7A through 7C are process flow diagrams illustrating a method for generating C2 congestion metrics according to example embodiments of this disclosure.
Figure 7B:
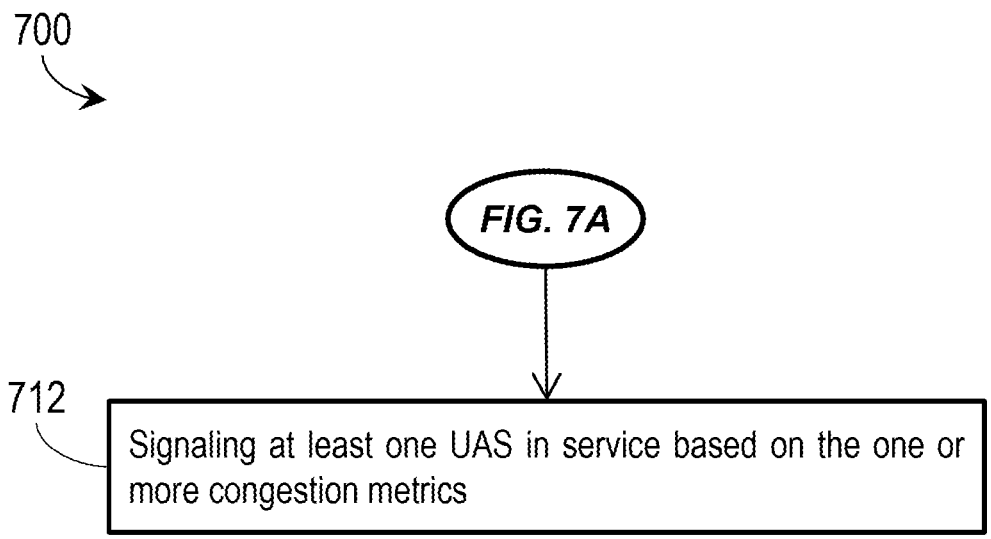
Figure 7C:
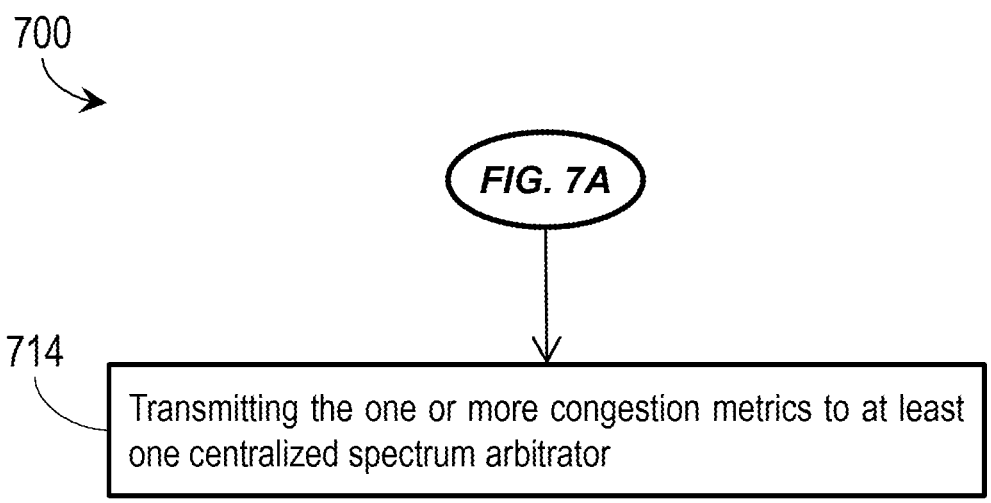

FIGS. 7A through 7C—Method

Referring now to FIG. 7A, the method 700 may be implemented by the GRS 106 and fusion engine 210 according to example embodiments of the inventive concepts disclosed herein and may include the following steps. At a step 702, a GRS establishes a C2 link on a C2 channel to one or more UAS, e.g., each UAS operating within, or entering, its coverage area or transmission range.

At a step 704, when the number n of UAS in service (e.g., via C2 link with the GRS) is not less than the number N of C2 channels allocated to the GRS, the GRS establishes C2 contingency links whereby two or more UAS share a C2 channel (e.g., via time slotting or time slicing) until enough spectrum space allows for each UAS to maintain a standard C2 link on its own C2 channel.

At a step 706, a fusion engine configured for execution on the GRS collects wait times for each UAS waiting for a standard C2 link on an unshared C2 channel. For example, the fusion engine may collect wait times T for each UAS waiting on a contingency C2 link (e.g., whereby the UAS shares a C2 channel with another UAS) for a standard C2 link. In some embodiments, the fusion engine collects wait times T' for each UAS entering the coverage area that must wait for either a contingency C2 link or a standard C2 link to open up.

At a step 708, the fusion engine generates dynamic variables S associated with probability distributions of the number n of UAS in service (either via standard C2 links or contingency C2 links on shared C2 channels) over time.

At a step 710, the fusion engine generates congestion metrics for the GRS by fusing the collected wait times and generated probability distributions. For example, the fusion engine generates time metrics associated with expected (e.g., mean) wait times (e.g., E [T] and/or E [T']), and submetrics based on the expected wait times, e.g., standard deviations of the expected wait times and maximum wait times. In some embodiments, the fusion engine generates channel availability metrics associated with an expected number of available C2 channels (e.g., E[(N-n)]), and submetrics based on the channel availability metrics, e.g., standard deviations of E[(N-n)] and expected idle times, e.g., when no UAS are in service and all C2 channels are available. In some embodiments, the fusion engine tracks the durations of GRS operating states, e.g., a nominal state wherein S<N; an off-nominal or saturated state wherein S≥N and S<W, (where W is the maximum number of UAS concurrently servable by the GRS via the at least one set of contingency C2 links); and a critical or danger state of the GRS wherein, S≥W (e.g., where no C2 channels may be available even for C2 contingency links).

The method 700 may additionally include method steps 712 and 714. Referring also to FIG. 7B, at the step 712, the fusion engine signals a UAS in service based on the generated congestion metrics, e.g., to request the UAS attempt to switch over to a different (e.g., less saturated) GRS to free spectrum resources.

Referring also to FIG. 7C, at the step 714, the fusion engine forwards generated congestion metrics to a centralized spectrum arbitrator (e.g., central server).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A ground radio station (GRS), comprising:
a communications interface comprising one or more antenna elements and one or more transceivers operatively coupled to the one or more antenna elements, the communications interface associated with N command and control (C2) channels, where N is an integer;
a traffic manager operatively coupled to the communications interface, the traffic manager configured to:
establish one or more concurrent C2 links to n unmanned aircraft systems (UAS) in service, where n is an integer, each C2 link associated with a C2 channel of the N C2 channels;
when $n \geq N$, establish at least one set of contingency C2 links corresponding to a C2 channel of the N C2 channels, each set of contingency C2 links associated with two or more UAS sharing the corresponding C2 channel;
and
at least one fusion engine communicatively coupled to the traffic manager, the fusion engine configured to:
collect one or more wait times corresponding to each of the two or more UAS sharing the corresponding C2 channel;
generate one or more dynamic variables S associated with the n UAS in service over time;
and
generate one or more congestion metrics associated with the N C2 channels by fusing the one or more wait times and the one or more dynamic variables S.

2. The GRS of claim 1, wherein the one or more congestion metrics include an expected wait time.

3. The GRS of claim 2, wherein the one or more congestion metrics include one or more time submetrics selected from:
a standard deviation of the expected wait time; and
a maximum wait time.

4. The GRS of claim 1, wherein the one or more congestion metrics include an expected number of available C2 channels.

5. The GRS of claim 4, wherein the one or more congestion metrics include one or more C2 channel availability submetrics selected from:
a standard deviation of the expected number of available C2 channels;
and
an expected idle time.

6. The GRS of claim 1, wherein the one or more congestion metrics are associated with at least one of:
a nominal state of the GRS, wherein $S<N$;
an off-nominal state of the GRS, wherein $S \geq N$ and $S<W$, and W is an integer corresponding to the maximum number of UAS concurrently servable by the GRS;
and
a critical state of the GRS wherein, $S \geq W$.

7. The GRS of claim 1, wherein the wait time is a first wait time, and:
the fusion engine is configured to collect one or more second wait times, each second wait time corresponding to a UAS waiting for a contingency C2 link.

8. The GRS of claim 1, wherein the fusion engine is configured to direct the GRS to signal at least one of the n UAS in service based on the one or more congestion metrics.

9. The GRS of claim 1, wherein:
the fusion engine is communicatively coupled to at least one spectrum arbitrator;
and
the fusion engine is configured to periodically forward the one or more congestion metrics to the spectrum arbitrator.

10. A method for generating command and control (C2) congestion metrics at a ground radio station (GRS) of a C2 link system, the method comprising:
establishing, via a GRS, at least one C2 link to an unmanned aircraft system (UAS) in service, the C2 link associated with a C2 channel;
when the number n of UAS in service is not less than the number of N C2 channels assigned to the GRS, where n, N are integers, establishing at least one contingency C2 link to two or more of the UAS over a C2 channel shared by the two or more UAS;
collecting, via a fusion engine of the GRS, one or more wait times corresponding to each of the two or more UAS on the shared C2 channel;
generating, via the fusion engine, one or more dynamic variables S associated with the number n of UAS in service via the at least one C2 link and the at least one contingency C2 link over time;
and
generating, via the fusion engine, one or more congestion metrics associated with the GRS by fusing the one or more wait times and the one or more dynamic variables S.

11. The method of claim 10, wherein generating, via the fusion engine, one or more congestion metrics associated with the GRS by fusing the one or more wait times and the one or more dynamic variables S includes:
generating at least one of an expected wait time and one or more time submetrics selected from:
a standard deviation of the expected wait time;
and
a maximum wait time.

12. The method of claim 10, wherein generating, via the fusion engine, one or more congestion metrics associated with the GRS by fusing the one or more wait times and the one or more dynamic variables S includes:
generating at least one of an expected number of available C2 channels and one or more C2 channel availability submetrics selected from:
a standard deviation of the expected number of available C2 channels;
and
an expected idle time.

13. The method of claim 10, wherein generating,
via the fusion engine, one or more congestion metrics associated with the GRS by fusing the one or more wait times and the one or more dynamic variables S includes identifying one or more of:
a nominal state of the GRS, wherein $S<N$;
an off-nominal state of the GRS, wherein $S \geq N$ and $S<W$, and W is an integer corresponding to the maximum number of UAS concurrently servable by the GRS;
and
a critical state of the GRS, wherein $S \geq W$.

14. The method of claim 10, further comprising:
signaling at least one of the n UAS in service based on the one or more congestion metrics.

15. The method of claim 10, further comprising:
  transmitting the one or more congestion metrics to at least one centralized spectrum arbitrator.

\* \* \* \* \*